United States Patent Office 3,071,580
Patented Jan. 1, 1963

3,071,580
6β-HYDROXY-16α,17α-ALKYLIDENDIOXY-11-OXYGENATED PREGNENES
Chester E. Holmlund, Pearl River, and Louis I. Feldman, Spring Valley, N.Y.; Ralph H. Evans, Jr., River Vale, N.J., and Seymour Bernstein, New City, and John P. Dusza, Nanuet, N.Y., assignors to American Cyanamid Company, New York, N.Y., a corporation of Maine
No Drawing. Filed Apr. 28, 1961, Ser. No. 106,149
7 Claims. (Cl. 260—239.55)

This invention relates to a microbiological hydroxylation of steroids. More particularly, it relates to the 6β-hydroxylation of steroids hereinafter described and novel 6β-hydroxy steroids resulting therefrom.

The compounds prepared by the process of the present invention can be illustrated by the following general formula:

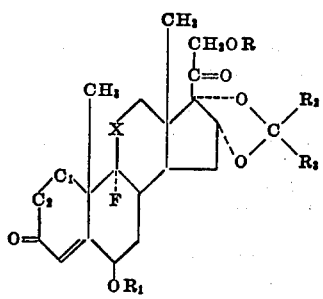

wherein $C_2$–$C_1$ is a divalent radical selected from the group consisting of —$CH_2$—$CH_2$— and —CH=CH— radicals, X is a radical selected from the group consisting of

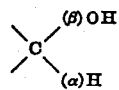

and O=C< radicals, R and $R_1$ is selected from the group consisting of hydrogen and lower alkanoyl radicals and $R_2$ and $R_3$ are the same or different and are hydrogen atoms or lower alkyl radicals.

The microbiological process of the present invention is carried out under aerobic conditions in the presence of a suitable nutrient medium at a temperature with the range of from about 15° C. to about 40° C. The steroid to be 6β-hydroxylated is added to the nutrient medium and fermentation is carried out with Phycomycete species (Z664). The transformation taking place in the reaction medium can be traced by paper chromatographic assay and is usually complete within a matter of several hours to seven days or longer. In carrying out the process of the present invention, Phycomycete species (Z664) (ATCC No. 14163) has been found to give good results. During the growth of the organism under favorable conditions, a hydroxyl group is introduced into the 6β-position of the steroid ring A. The exact mechanism of this 6β-hydroxylation is not known but is believed to be an enzymatic reaction.

The Phycomycete species (Z664) has the following characteristics. Cultures on potato dextrose agar spreading broadly, nearly covering the Petri plate in ten days; colony outlines extremely irregular. Colonies extending rapidly by stoloniferous hyphae deep into the agar substrate and forming wide submerged margins. Central zones raised. Aerial mycelium cottony and white to cream colored. Reverse in similar shades. Mycelium generally monopodially branched; irregular in diameter, averaging from 5 to 12μ. Numerous inflations and constrictions are found in the hyphae, but remains coenocytic. In older cultures occasionally septate hyphae may be observed. Hyphae commonly aggregated into fascicles. Older mycelial elements highly vacuolate with oil droplets numerous; protoplasmic streaming may be observed in younger elements. Sporulation absent. Cultures on cornmeal agar thin, spreading broadly; 6–8 cm. in ten days. Colony margins very irregular. Aerial growth white, cottony and raised in patches. Reverse white. Microscopic details as on potato dextrose agar. Cultures on malt-extract agar growing more restrictedly, from 2–3 cm. in diameter in ten days. Raised 1 cm. or more in central zones. Aerial mycelium white, cottony; reverse yellowish. Microscopic details as on potato dextrose agar.

A suitable nutrient medium for the fermentation of the present invention contains a soluble source of carbon, nitrogen and mineral trace elements. Sources of carbon include sugars such as glucose, sucrose, maltose, dextrose, xylose, galactose and so forth. Also, alcohols such as glycerol or mannitol, corn starch, etc., organic acids such as citric acid, maleic acid, acetic acid and various natural products containing carbohydrates such as corn steep liquor, soya bean meal, cotton seed meal and many available materials which have been used heretofore as a source of carbon in fermentation processes. Usually a variety of the above carbon sources are used in a medium which gives the best results. Suitable sources of nitrogen include some of the above named materials such as corn steep liquor, soya bean meal, cottonseed meal and the like and various other substances such as beef extract, casein, yeast, enzymatically digested proteins and degradation products including peptones, amino acids and many other available proteinaceous materials which have been found to be suitable in supporting the growth of Phycomycete species (Z664). Inorganic sources of nitrogen include urea, ammonium salts, nitrates and the like. The latter may be used in the medium as a source of nitrogen to provide a favorable growth medium for the organisms.

The mineral requirements of fermentation are usually supplied in the crude materials which are often used as sources of carbon and nitrogen or in the water that is used in the process. However, it is often advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ⅓ to 2 volumes of air per volume of medium per minute. Agitation in the bottles or fermenter tanks is provided by a mechanical impeller. While the organism will grow at temperatures between 5° and 45° C., it is preferable to carry out the process as stated hereinbefore at a temperature of from about 15° to 37° C.

The Δ⁴ steroids which can be used in the process of the present invention include, for example, 9α-fluoro-11β,21-dihydroxy - 16α,17α - isopropylidenedioxy - 4 - pregnene-3,20-dione; 9α - fluoro - 11β,21 - dihydroxy - 16α.17α-isopropylidenedioxy - 1,4 - pregnadiene - 3,20 - dione; 9α - fluoro - 21 - hydroxy - 16α,17α - isopropylidenedioxy-4-pregnene-3,11,20-trione and esters thereof and the like. When using the above steroid substrates in the fermentation, the products formed are the free alcohols of these steroids. It is generally desirable that the steroids be added to the fermentation in solution or in finely divided form. A preferred method is to dissolve in methanol or other water miscible solvents and add it to the fermentation medium at the desired stage in the process. Although the steroid may precipitate from solution when so added, it is dispensed throughout the medium as a fine suspension and becomes readily available to the organism for oxidation. The amount of steroid added to the fermentation may vary considerably, but it is generally on the order of 1/10 to 1 gram per liter of medium.

To prepare inocula, 1.0 ml. of washed spore and cell suspension of the Phycomycete species (Z664) is used to inoculate 100 ml. of sterile medium such as described in the examples hereinafter in a 500 ml. flask. The medium is sterilized by autoclaving for 15 minutes at 15 pounds steam pressure (120° C.). The inoculated flask is incubated at about 28° C. on a shaker for about 24–72 hours. Such inocula may be used to inoculate larger batches of sterile medium in bottles and such bottle cultures, after fermentation, may be used to inoculate large batches of medium in fermenter tanks.

During the fermentation process, it may be desirable to add anti-foaming agents such as silicones, glyceride oils and the like. These compounds are added from time to time in the amounts needed. In the process of the present invention, the 100 ml. batches of inoculated medium in 500 ml. flasks are usually incubated for a period of 16 to 40 hours at a temperature of about 28° C. At this point, 10 mg. of substrate steroid dissolved in 1 ml. of methanol is added to each flask and the fermentation continued at about 28° C. The fermentation is allowed to proceed for a period of time long enough to achieve maximum conversion of the steroid substrate to the corresponding 6β-hydroxy steroid. This period may vary from several hours to 144 hours or longer.

At the conclusion of the fermentation process the 6β-hydroxylated steroid is recovered from the fermentation medium by the following procedure. The contents of the fermentation tube are extracted with three volumes of ethyl acetate. The ethyl acetate phase is evaporated to dryness and the residue dissolved in an appropriate volume of a mixture consisting of a 1:1 ratio of water-saturated ethyl acetate and methanol. This solution is used for characterization of steroid content as described hereinafter.

In large scale fermentations, the crude product or products may be recovered from the fermentation beer by simple solvent extraction using a water immiscible solvent such as, for example, chlorinated hydrocarbons, alcohols, esters, ketones and so forth. Further purifications and separations of the steroid products from extractions may be accomplished by methods well known to those skilled in the art. Separation and purification of steroid mixtures often require the use of chromatography.

The 6β-hydroxylating process of the present invention is useful for preparing products that are active diuretics and can be employed as chemotherapeutic agents useful in elimination of water from the tissues. On the other hand, they have little or no glucocorticoid activity and therefore represent a separation of activity seldom possessed by steroids. The compounds prepared by the process of the present invention contain a 6β-hydroxy group which enhances water solubility making the compounding of pharmaceutical preparations less difficult.

The following examples illustrate in detail the preparation of 6β-hydroxy steroids from the corresponding 6-methylene steroids.

Example 1

A 100 ml. quantity of a medium consisting of corn steep liquor (1.0%), corn starch (1.0%), molasses (2.0%) and adjust to pH 7.0 with sodium hydroxide in a 500 ml. flask is inoculated from a potato dextrose agar slant. The flask is shaken on a reciprocating shaker at 28° C. for 72 hours. At this time 5 ml. of the resulting growth is added to each of a series of five 500 ml. Erlenmeyer flasks containing 100 ml. of the above medium. The flasks are incubated as described above for 24 hours at which time 20 mg. of steroid dissolved in 1 ml. of methanol is added to each flask. The steroids employed are 4-pregnene-3,20-dione; 11α-hydroxy-4-pregnene-3,20-dione; 17α,21-dihydroxy-4-pregnene-3,20-dione; 11β,17α, 21 - trihydroxy - 4 - pregnene-3,20-dione; 9α-fluoro-21-hydroxy - 16α,17α - isopropylidenedioxy-4-pregnene-3,11,20-trione; 9α - fluoro - 11β,21 - dihydroxy-16α,17α-isopropylidenedioxy-4-pregnene-3,20-dione and 9α-fluoro-11β,21-dihydroxy - 16α,17α - isopropylidenedioxy-1,4-pregnadiene-3,20-dione. After addition of steroid, incubation is continued as described above. Samples are taken periodically over the period 8–144 hours. The samples are analyzed by paper chromatographic procedures. The 6β-hydroxy product is developed in the same chromatography jar to provide a reference point for the identification of the products formed. In addition to identity of mobility with the reference product, the distinct orange color which develops immediately upon heating (105° C./3 minutes) the paper strips after spraying with an alcoholic solution of 0.1 M phthalic acid and 0.1 M p-phenylenediamine is specific for 6β-hydroxy steroids. Thus the presence of the 6β-hydroxy steroid is observed in each case. The time required for maximum yield of 6β-hydroxy product varies for the specific substrate used.

Example 2

In a manner similar to that described in Example 1, 9β,11β - epoxy - 17α,21-dihydroxy-4-pregnene-3,20-dione, 17α,21-dihydroxy-4-pregnene-3,11,20-trione and 9α-fluoro-11β,21 - dihydroxy - 16α,17α-isopropylidenedioxy-4-pregnene-3,20-dione are fermented with Phycomycete species (ATCC No. 14163). The steroid is added 48 hours after inoculation instead of 24 hours as described in Example 1. Samples taken 120 hours after steroid addition indicate a good yield in each case of the corresponding 6β-hydroxy derivative.

Example 3

Twelve liters of medium described at the beginning of Example 1 is inoculated with 600 ml. of a 71 hour growth of culture Phycomycete species (Z664). The mash is aerated at the rate of 9.2 liters of air/minute, agitated at 400 r.p.m. and the fermentation carried out at 28° C. Fifty hours after inoculation, 3 grams of 9α-fluoro-11β,21-dihydroxy - 16α,17α-isopropylidenedioxy-4-pregnene-3,20-dione dissolved in 100 ml. of methanol is added to the fermentation. The fermentation is continued for an additional 53 hours and then harvested. The final volume of mash upon harvest is 10 liters, pH 7.6. The first extraction is carried out with ten liters of ethyl acetate, filtered and the immiscible layers separated. The aqueous layer is extracted twice more with ten liters of ethyl acetate each time and the three extractions combined and concentrated to an oil under reduced pressure.

The oily residue is extracted twice with 40 ml. of methanol each time and the methanol extractions concentrated to dryness. The dry residue is subjected to partition chromatography using a 300 g. column of diatomaceous earth moistened with the lower phase of an equilibrated solvent system composed of 1 volume of water, 5 volumes of p-dioxane and 6 volumes of cyclohexane. The upper phase is used to develop the column and the peaks at 1.8 column retention volumes (9α-fluoro-6β,21-dihydroxy-16α,17α - isopropylidenedioxy-4-pregnene-3,11,20-trione) and at 8.9 column retention volumes (9α-fluoro-6β,11β, 21 - trihydroxy - 16α,17α-isopropylidenedioxy-4-pregnene-3,20-dione) are separately evaporated to dryness under reduced pressure. From the first peak the dry residue is dissolved in acetone and 1.32 g. of crude crystals are separated. Recrystallization from acetone after decolorization with activated charcoal yields 195 mg. of a compound which is characterized as 9α-fluoro-6β,21-dihydroxy-16α, 17α-isopropylidenedioxy-4-pregnene-3,11,20-trione on the following basis; melting point 243–245.5° C.

$\lambda_{max}^{MeOH}$ 227 mμ ($\epsilon = 1\ 300$); $[\alpha]_D^{25} + 94°$ (MeOH)

The blue tetrazolium reaction indicates the side chain is intact and the ultraviolet peak at 255 mµ after treatment with alkali indicate the conversion of the C6β-hydroxyl to a C6-ketone.

The semi-crystalline residue from the column peak at 8.9 column retention volumes is recrystallized twice from acetone-ether to yield 477 mg. of 9α-fluoro-6β,11β,21-trihydroxy - 16α,17α - isopropylidenedioxy-4-pregnene-3,20-dione. The following physical characteristics are observed; melting point 240.5–243.5° C.

$\lambda_{max.}^{MeOH}$ 233 mµ ($\epsilon$=15,400); [α]$_D$ +71.6° (MeOH)

*Example 4*

Ten grams of lyophilized cells of *N. corallina*, ATCC 999, are suspended in 1 liter of tris(hydroxymethyl) aminomethane, 0.05 M, pH 7.6. Ten mg. of phenazinemethosulfate and 199 mg. of 9α-fluoro-6β,11β,21-trihydroxy - 16α,17α - isopropylidenedioxy - 4 - pregnene-3,20-dione are added and the entire reaction mixture aerated at 23° C. for 24 hours, at which time assay indicated the presence of a quantity of 9α-fluoro-6β,11β,21-trihydroxy - 16α,17α - isopropylidenedioxy - 1,4 - pregnadiene-3,20-dione.

The reaction mixture of 1 liter is extracted once with 2 liters of ethyl acetate and three additional times with 1 liter each time. The four extracts are pooled and concentrated to dryness under reduced pressure.

The residue is subjected to partition chromatography using 100 g. of diatomaceous earth moistened with the lower phase of a system consisting of 1 volume of water, 5 volumes of p-dioxane and 4 volumes of cyclohexane. The upper phase is used to develop the column and the peak at 4.7 column retention volumes is collected and evaporated to dryness under reduced pressure. The dry residue is dissolved in acetone, and after adding petroleum ether, 36 mg. of crystalline 9α-fluoro-6β,11β, 21 - trihydroxy - 16α,17α - isopropylidenedioxy - 1,4-pregnadiene-3,20-dione are separated with the following properties; melting point 277–282° C., $\lambda_{max.}^{MeOH}$ 240 mµ ($\epsilon$16,000); [α]$_D$ +72° (pyridine)

*Example 5*

Twenty-five mg. of 9α-fluoro-6β,21-dihydroxy-16α,17α-isopropylidenedioxy-4-pregnene-3,11,20-trione is dissolved in 1 ml. of acetic anhydride and 2 ml. of anhydrous pyridine. The solution is allowed to stand overnight in a closed flask. The solvents are removed by distillation under vacuum. The residue is recrystallized twice from acetone-hexane to give crystalline 9α-fluoro-6β,21-dihydroxy - 16α,17α - isopropylidenedioxy - 4 - pregnene - 3, 11,20-trione-6β,21-diacetate.

*Example 6*

In a manner similar to that described in Example 5, the respective 6β,21-diacetates are prepared from 9α-fluoro - 6β,11β,21 - trihydroxy - 16α,17α - isopropylidenedioxy-4-pregnene-3,20-dione and from 9α-fluoro-6β,11β, 21-trihydroxy-1,4-pregnadiene-3,20-dione.

We claim:

1. Compounds of the formula:

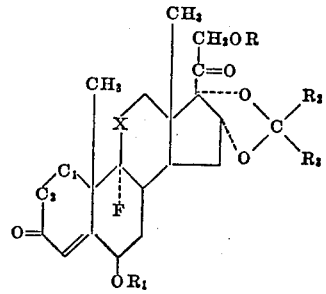

wherein —C$_2$—C$_1$— is a divalent radical selected from the group consisting of —CH$_2$—CH$_2$— and —CH=CH— radicals, X is a radical selected from the group consisting of

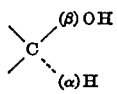

and O=C< radicals, R and R$_1$ are selected from the group consisting of hydrogen and lower alkanoyl radicals, R$_2$ and R$_3$ are selected from the group consisting of hydrogen atoms and lower alkyl radicals.

2. The compound 9α-fluoro-6β,11β,21-trihydroxy-16α, 17α-isopropylidenedioxy-4-pregnene-3,20-dione.

3. The compound 9α-fluoro-6β,11β,21-trihydroxy-16α, 17α-isopropylidenedioxy-1,4-pregnadiene-3,20-dione.

4. The compound 9α-fluoro-6β,21-dihydroxy-16α,17α-isopropylidenedioxy-4-pregnene-3,11,20-trione.

5. The compound 9α-fluoro-6β,11β,21-trihydroxy-16α, 17α - isopropylidenedioxy - 4 - pregnene - 3,20 - dione-6β,21-diacetate.

6. The compound 9α-fluoro-6β,11β,21-trihydroxy-16α, 17α - isopropylidenedioxy - 1,4 - pregnadiene - 3,20 - dione-6β,21-diacetate.

7. The compound 9α-fluoro-6β,21-dihydroxy-16α,17α-isopropylidenedioxy - 4 - pregnene - 3,11,20 - trione-6β,21-diacetate.

References Cited in the file of this patent

UNITED STATES PATENTS

| | | |
|---|---|---|
| 2,844,513 | Wettstein et al. | July 22, 1958 |
| 2,879,206 | Weintraub et al. | Mar. 24, 1959 |
| 2,981,659 | Fonken et al. | Apr. 25, 1961 |
| 2,937,975 | Figdor et al. | May 24, 1960 |
| 2,990,401 | Bernstein et al. | June 27, 1961 |